Patented Dec. 27, 1932

1,891,987

UNITED STATES PATENT OFFICE

JAMES B. JENNINGS AND GEORGE P. ESTES, OF McPHERSON, KANSAS

TREATING CRUDE OIL

No Drawing.   Application filed October 8, 1931.  Serial No. 567,755.

This invention relates to a new and improved method of treating crude oil, and a composition or compound to be employed therein, whereby removal of the water and B. S. from the crude oil is greatly facilitated and made more efficient and is accomplished at lower cost for labor and material.

It is an object of this invention to provide a method and a compound or composition of the type described which contains no acid or poison, and which does not require that the oil be heated during the treatment.

It is also an object of this invention to provide a method and a compound or composition employed therein as pointed out above for removing or separating water from the crude oil and also for separating the water from the B. S., which does not call for the use of elaborate or expensive machinery either in the process or in the making of the compound or composition disclosed herein.

It is also an object of this invention to provide a method and a compound or composition employed therein which involves the injection or other placing of the compound or composition directly into the oil line, or which may be used in oil storage or stock tanks, and which will not harm either the pipes or tanks or other machinery.

These and other objects of the invention, its nature, and its composition and combination of materials and ingredients, and the sequence and duration of steps and operations involved in the process of assembling and applying the same, will be readily understood by any one acquainted with the art to which this invention relates upon consulting the following description.

It is believed that the provision of the compound or composition herein described and the method of using the same is a distinct advance in the oil industry, being an improvement in the respects of economy and safety in use, and inexpensiveness, over known materials and processes of this general type. One observation made during the use of the process and compound or composition of the invention is that it raises the specific gravity of oil treated according to the principle taught herein.

A preferred formula of proportions of the compound or composition of the invention is as follows:—

|  | Per cent |
|---|---|
| Castor oil | 25 |
| Spirits of niter | 15 |
| Salt | 10 |
| Gasoline | 50 |

An example of the practical working of the formula may be illustrated in the following table of ingredients composing one gallon.

One quart of castor oil.
One pint of spirits of niter.
One pint of salt.
Two quarts of gasoline.

The following is a method of compounding the above into the compound or composition of the invention. To the castor oil is added the spirits of niter. Then, to the combination of castor oil and spirits of niter the salt is added, and the whole permitted to stand until the salt has been taken up. At this point the compound or composition of the invention is ready for use, simply upon the addition of the gasoline ingredient. Owing to the volatility of the gasoline, it is inadvisable to add this ingredient until it is desired to make the compound or composition ready for use. However, various fixing agents might be employed to overcome this condition.

In the event that the oil to be treated with the compound or composition does not contain an average amount of water and B. S., it is permissible to reduce the amount of castor oil and the amount of spirits of niter, and thereby effect economies. In extremely cold climates it may be necessary to heat the oil before treating it as above, but no heating of the oil at any time is ordinarily required.

It is believed that the above is sufficient description to enable any one acquainted with the art to which this invention relates to understand, make and use the invention. However, it is to be definitely understood that I do not desire to limit the application of this invention to the particular modification set out herein to illustrate the principles thereof, and any change or changes may be made in materials and ingredients, and in the sequence and duration of steps and operation disclosed, within the spirit and scope of the invention.

What is claimed is:—

1. A method of treating crude oil to remove water and B. S. consisting in mixing with the crude oil a mixture consisting of castor oil, spirits of niter, common salt and a diluent.

2. A method of treating crude oil to remove water and B. S. consisting in mixing with the crude oil a mixture of castor oil, spirits of niter, common salt and gasoline.

3. A substance for treating crude oil as described consisting of castor oil, spirits of niter, common salt and a diluent.

4. A substance for treating crude oil as described consisting of castor oil, spirits of niter, common salt, and gasoline.

5. A substance for treating crude oil as described comprising a mixture of castor oil, spirits of niter, common salt, and gasoline.

6. A substance for removing B. S. from petroleum comprising a mixture of approximately 25% of castor oil, 15% of spirits of nitre, 10% of common salt, and 50% of gasoline.

7. A method of treating petroleum oil for removing B. S. therefrom comprising injecting into the oil to be treated a quantity of a mixture of castor oil, spirits of nitre, common salt, and a solvent.

In testimony whereof we affix our signatures.

JAMES B. JENNINGS.
GEORGE P. ESTES.